(12) United States Patent
Itoh et al.

(10) Patent No.: US 6,913,811 B2
(45) Date of Patent: Jul. 5, 2005

(54) PHOTOCATALYTIC COLORED MEMBER AND METHOD OF MANUFACTURING THE SAME

(75) Inventors: Hideo Itoh, 1162-3, Nagakuni, Tsuchiura-shi, Ibaraki, 300-0817 (JP); Toyonori Matsuda, Kumamoto (JP)

(73) Assignees: Agency of Industrial Science & Technology, Tokyo (JP); Ministry of International Trade & Industry, Tokyo (JP); Hideo Itoh, Tsukuba (JP)

( * ) Notice: Subject to any disclaimer, the term of this patent is extended or adjusted under 35 U.S.C. 154(b) by 0 days.

(21) Appl. No.: 09/749,876

(22) Filed: Dec. 29, 2000

(65) Prior Publication Data

US 2001/0040716 A1 Nov. 15, 2001

(30) Foreign Application Priority Data

May 9, 2000 (JP) .................................... 2000-135405

(51) Int. Cl.[7] ............................................... B32B 9/00
(52) U.S. Cl. .................... 428/131; 428/38; 428/134; 428/137; 428/138; 428/156; 428/167
(58) Field of Search ............... 428/38, 131, 134, 428/137, 138, 156, 167, 135, 913; 502/5, 350, 527.11, 527.13, 527.19, 527.21, 527.24, 242

(56) References Cited

U.S. PATENT DOCUMENTS

| 3,931,049 | A | * | 1/1976 | Ford et al. ............... 423/213.5 |
| 4,695,301 | A | * | 9/1987 | Okajima et al. .......... 210/510.1 |
| 4,701,366 | A | * | 10/1987 | Deckman et al. ............ 428/188 |
| 4,847,243 | A | * | 7/1989 | Wallace ........................ 514/30 |
| 5,102,853 | A | * | 4/1992 | Chattha et al. ........... 423/213.5 |
| 5,205,940 | A | * | 4/1993 | Graetzel ..................... 210/748 |
| 5,407,738 | A | * | 4/1995 | Tabata et al. .................. 428/38 |
| 5,472,798 | A | * | 12/1995 | Kumazawa et al. ......... 428/913 |
| 5,849,383 | A | * | 12/1998 | Kumazawa et al. ........... 428/38 |
| 6,051,513 | A | * | 4/2000 | Kumazawa et al. ........... 428/38 |
| 6,248,436 | B1 | * | 6/2001 | Kumazawa et al. ......... 428/328 |
| 6,306,529 | B1 | * | 10/2001 | Shimizu et al. ............... 428/38 |
| 6,326,094 | B1 | * | 12/2001 | Asano et al. .................. 428/38 |
| 6,335,094 | B1 | * | 1/2002 | Owaki et al. ................ 428/374 |
| 6,490,090 | B1 | * | 12/2002 | Kumazawa et al. ........... 428/38 |

OTHER PUBLICATIONS

Lewis, Sr. Richard J., Hawley's Condensed Chemical Dictionary 1997, John Wiley & Sons, INC., 13th ed. p. 996.*

* cited by examiner

Primary Examiner—Harold Pyon
Assistant Examiner—Alicia Chevalier
(74) Attorney, Agent, or Firm—Oblon, Spivak, McClelland, Maier & Neustadt, P.C.

(57) ABSTRACT

A photocatalytic colored member includes a laminate formed by laminating a plurality of thin-film layers of photocatalytic material and a plurality of thin-film layers of support material, with vacant layers formed such that they are open to the outside on the rear surface side of the thin-film layers of photocatalytic material.

46 Claims, 4 Drawing Sheets

PHOTOCATALYTIC COLORED MEMBER AND METHOD OF MANUFACTURING THE SAME

BACKGROUND OF THE INVENTION

1. Field of the Invention

This invention relates to a photocatalytic colored member that gives visual coloring effects by achieving the desired optical reflection/transmission characteristics through the interference or diffraction of light, and also has a photocatalytic effect which has the effect of decomposing organic material adsorbed to the surface of raw material with moisture or by irradiation of ultraviolet light the addition of moisture or irradiation with ultraviolet light.

2. Description of the Prior Art

Titanium dioxide or other so-called photocatalytic materials are known to exhibit such effects as the decomposition of organic matter or the electrolysis of water when irradiated with ultraviolet light, and various consumer products that exploit this property have been developed. Among these, exterior wall covering material using photocatalytic material is able to photocatalyze adhering contaminants and algae and the like so that it can be rinsed off naturally with rainwater, and thus the costs of washing exterior walls can be reduced. In addition, if photocatalytic material is used as a component of interior walls, it is known to decompose gases and adhered substances which are hazardous for humans. In order for photocatalytic materials to be further popularized as interior and exterior wall covering materials (hereinafter referred to as "members"), it is necessary to establish techniques for coloring the members with the desired color.

There are several conceivable techniques for obtaining members of the desired color with the photocatalytic effect maintained. For example, there is a technique of dispersing a powder of photocatalytic material within a paint of a certain color and painting the member. With this method, there is a problem in that the photocatalytic effect ocurrs only at that portion of the photocatalytic material exposed upon the surface, so the surface area of contact with contaminants cannot become greater than the surface area of one layer of photocatalytic powder, and thus a high photolytic effect cannot be expected (Problem 1).

Moreover, the photolytic effect due to photocatalysis extends not only to the contaminants but also to the paint itself. Therefore, those portions of the substances making up the paint that are in contact with the photocatalytic material are subject to photolysis so not only will the color deteriorate but the photocatalytic material will fall off, so the coloring and photolytic performance of the paint film cannot be maintained over the long term (Problem 2). This phenomenon is a well-known phenomenon known as the chalking of paint.

Since this photolytic effect does not occur unless the photocatalytic material comes into direct contact with the substance to be decomposed, techniques have been proposed whereby silicon dioxide or another inorganic substance that is not subject to the effects of the photocatalytic effect is mixed together with the pigment and formed, or the powder of photocatalytic material is partially coated with material that is not subject to the photocatalytic effect and then dispersed within the paint or the like. However, with such techniques, the surface area of contact between the photocatalytic material and the substance to be removed is decreased, so the photolytic performance is further decreased and thus a high photolytic effect cannot be expected as in the case of Problem 1.

There is also a method of adhering powdered photocatalytic material to a resin sheet or other carrier material. In order to obtain coloring by this method, the resin sheet will be colored, so there are limits to coloring, and decomposition and deterioration of the carrier material occurs due to the photolytic effect. While relatively durable carrier materials made of Teflon have also been developed, the heat-resistance temperature is the decomposition temperature of Teflon or roughly 300° C., so this cannot be used in materials for heat-resistant applications (Problem 3).

Conceivable methods of obtaining coloring without using dye or pigment include methods that utilize the interference or diffraction of light. For example, there is a method wherein a sub-micron titanium oxide thin film is formed upon the surface of a sheet of metallic titanium by means of anodization and then coloring is obtained by the effect of interference of light between the titanium plate and the surface of titanium oxide. While semi-permanent coloring can be obtained with this method, it has problems in that:

(1) oxidation is performed by passing a current through the metallic titanium plate, so it is not applicable to transparent glass substrates or other diverse types of substrates, (2) a metallic titanium surface with a high smoothness is required for the substrate, and (3) the structure of the titanium oxide formed by anodization is said to be amorphous, not the anatase structure said to have a high photolytic effect, and thus a large photolytic effect cannot be expected (Problem 4).

Moreover, in order to obtain coloring in the visible range, a sub-micron film thickness of titanium oxide is required, and in order to obtain the desired color uniformly, even finer film-thickness control down to $1/10$ of that is required, among other problems (Problem 5).

In addition, another conceivable coloring method that does not use dye or pigment makes use of diffraction gratings. A diffraction grating is an optical component formed by creating a fixed periodic structure upon a substrate, known to have the property of reflecting light of a specific wavelength depending on the period at a certain angle. However, an ordinary diffraction grating has a wide range of wavelengths of reflected light, and the wavelength of the reflected light depends on the angle, so the color changes depending on the viewing angle of the diffraction grating, thus giving a rainbow effect from red to violet, for example, and it is impossible to obtain the desired color over a wide angular range (Problem 6).

In addition, since a diffraction grating has a fine structure on the $\mu m$ order, dust on its surface or the adhesion of contaminants will spoil its performance. For this reason, unless the surface is covered with a clear material or similar steps are taken, a diffraction grating can be used only in a special clean environment.

Therefore, present invention has as its object to provide a photocatalytic colored member that has a photocatalytic effect higher than that of conventional materials, and can also maintain the desired clear color for the long term.

SUMMARY OF THE INVENTION

In order to achieve the aforementioned objects, the photocatalytic colored member according to the present invention comprises a laminate formed by laminating a plurality of thin-film layers of photocatalytic material and a plurality of thin-film layers of support material, with vacant layers formed such that they are open to the outside on the rear surface side of the thin-film layers of photocatalytic material.

In addition, it comprises those wherein an opening is formed in the thin-film layers of photocatalytic material and the photocatalytic colored member formed such that the vacant layers communicate with the openings.

The photocatalytic material may be titanium dioxide.

In addition, the thin-film layers of support material may be made of metals, semiconductors or insulators, each with a melting point of 400° C. or higher.

The openings may be shaped like parallel grooves, or may be circular, elliptical or polygonal.

The photocatalytic colored member may be formed by providing, upon a portion or the entire surface of the substrate, laminates consisting of the laminated thin-film layers of photocatalytic material and thin-film layers of support material which maintain the vacant layers, i.e., spaces, by means of thin-film layers of support material formed at the center having a circular, elliptical or polygonal cross section.

The surface area of each layer of the laminated thin-film layers of photocatalytic material may be equal, or may become larger or smaller when going from the surface toward the bottom layer.

A film of titanium oxide with the anatase structure or amorphous structure may be used as the thin-film layers of photocatalytic material.

The method of manufacturing a photocatalytic colored member according to the present invention comprises the steps of: laminating a plurality of layers of thin-film layers of photocatalytic material and thin-film layers of support material, forming a plurality of openings through a plurality of layers of the multi-layer film by means of physical dry etching with argon ions or the like, and next, using wet etching to remove excess support material to form, on the rear surface side of the thin-film layers of photocatalytic material, vacant layers or spaces adjacent to remaining support material that are open to the outside.

In addition, the method of manufacturing a photocatalytic colored member according to the present invention comprises the steps of: laminating a plurality of layers of thin-film layers of photocatalytic material and thin-film layers of support material, using dry etching to form, on the rear surface side of the thin-film layers of photocatalytic material, vacant layers that are open to the outside, where as the raw material gas for physical dry etching, argon gas or oxygen gas as the gas that performs physical etching is used simultaneously with haloid gas such as chlorine gas or hydrogen chloride gas as the gas that performs chemical etching, so the surface area of the thin-film layers of support material can be made smaller than that of the thin-film layers of photocatalytic material without performing the process of wet etching.

In addition, in the aforementioned manufacturing method, the thin-film layers of photocatalytic material are made of titanium oxide, and the equivalent surface area is increased by etching the titanium oxide film on the surface with wet etching or dry etching.

As described above, the photocatalytic colored member according to the present invention fundamentally consists of vacant layers open to the outside formed on the rear surface side of the photocatalytic material to increase the surface area of contact with contaminates, thereby achieving the purpose of obtaining a high photocatalytic effect.

These and other objects and features of the invention will be better understood from a consideration of the following detailed description based upon the accompanying drawing.

DESCRIPTION OF THE PREFERRED EMBODIMENTS

Figure 1A:
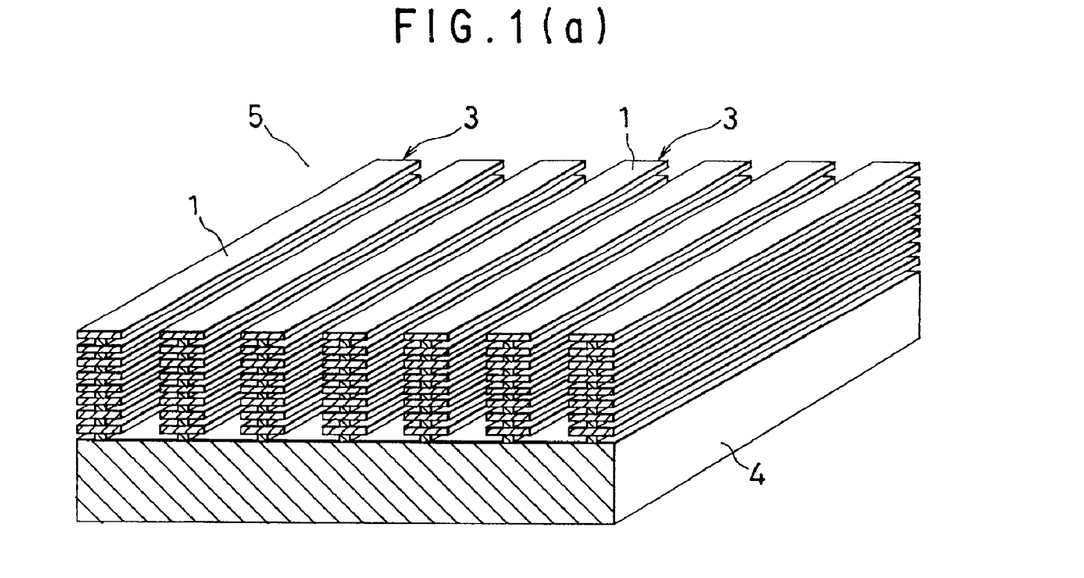
FIG. 1(a) is a perspective diagram showing one embodiment of the photocatalytic colored member according to the present invention.
Figure 1B:
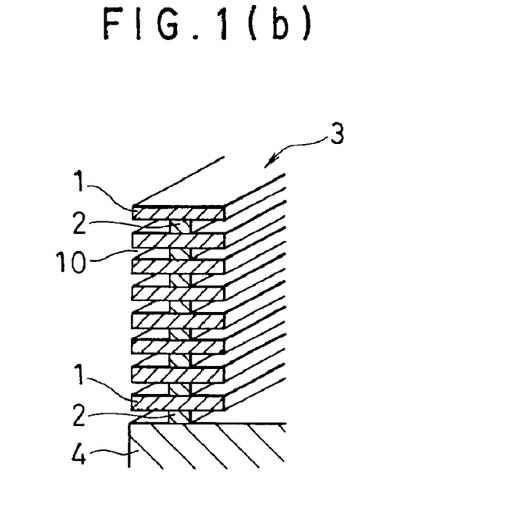
FIG. 1(b) is a partial enlargement of the member of FIG. 1(a).

FIG. 1 shows one example of a photocatalytic colored member 5 according to the present invention. The photocatalytic colored member 5 is constituted by disposing upon a substrate 4 at a stipulated interval a plurality of photocatalytic colored bodies 3 constituting a plurality of long, thin rectangular thin-film layers of photocatalytic material 1 consisting of titanium dioxide ($TiO_2$), etc. alternating with thin-film layers of support material 2 consisting of silicon dioxide ($SiO_2$), etc. having a width narrower than that of the thin-film layers of photocatalytic material 1.

The thin-film layers of support material 2 may be made of an inorganic or organic substance that is not decomposed by the photocatalytic effect and that does not present a major obstacle to the passage of light down to the lowest layer when in a laminated structure as described above. Specific examples of such a substance include not only the silicon dioxide ($SiO_2$) described above, but also silicon nitride ($SiN_x$) and indium-tin oxide (ITO).

In addition, even if they may be optically non-transparent, gold, silver, titanium or other oxidation-resistant metals can give coloring if their occupied surface area is small, so they can also be used as the materials for the aforementioned thin-film layers of support material.

Moreover, in the event that the goal of usage is high air temperature resistance, it is preferably a metal with a melting point of 400° C. or higher or a semiconductor.

The thickness of the aforementioned thin-film layers of photocatalytic material 1 is set to be an optical film thickness ¼ of the central wavelength λ of the desired light to be emitted, while the thickness of the thin-film layers of support material 2 is set to be an optical film thickness of λ/4 at the equivalent index of refraction including the vacant space. In addition, the period at which the various lines are disposed is set to a period of roughly the central wavelength in order to exhibit the optimal light-emission characteristics. Note that the thickness of the thin-film layers of photocatalytic material 1 and the thickness of the thin-film layers of support material 2 as described above are not simply the thickness of that layer as described above, but rather it must be such that the optical thickness becomes λ/4 in consideration of the functions of interference and diffraction of light, but for simplicity in explanation below, this shall be simply described as "set to λ/4."

The width of the thin-film layers of support material 2 should be constant and as narrow as possible, but in consideration of the support strength, it should be roughly the width of the narrowest of the thin-film layers of photocatalytic material 1. Changes in the width of the thin-film layers of photocatalytic material can be determined depending on the saturation and luminosity of the color to be exhibited.

The titanium dioxide layers should preferably have the anatase structure or amorphous structure. In particular, in the presence of ultraviolet light and water, titanium oxide with the anatase structure has a strong effect of decomposing contaminants adhering to the surface of the titanium dioxide due to the photocatalytic effect.

At the time of manufacture of a photocatalytic colored member 5, this can be performed by the method shown in FIG. 2, for example. To wit, as shown in FIG. 2(*a*), first silicon dioxide ($SiO_2$) 2 is sputtered upon a silicon (Si) substrate 4, to form a layer of a thickness of λ/4 of the light of the desired color. Thereupon, titanium dioxide ($TiO_2$) 1 is sputtered to form a layer of a thickness of λ/4 of the light of the desired color by sputtering.

Figure 2A:
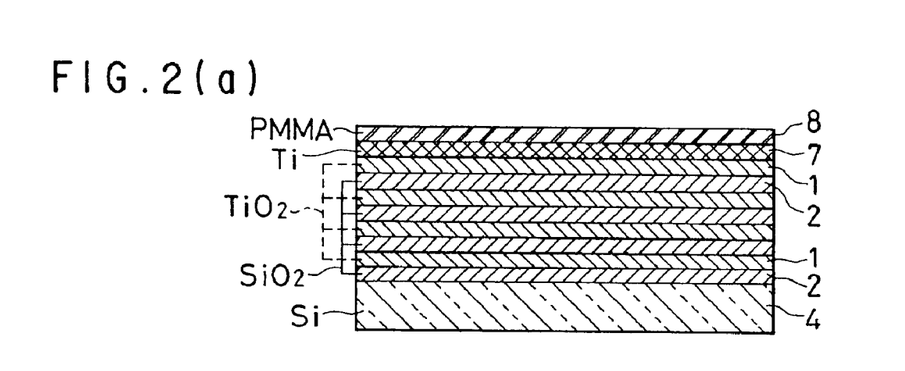
FIGS. 2(a), (b), (c) and (d) is a manufacturing process explanatory diagram showing the process of manufacturing a photocatalytic colored member using the method of manufacturing the photocatalytic colored member according to the present invention.
Figure 2B:
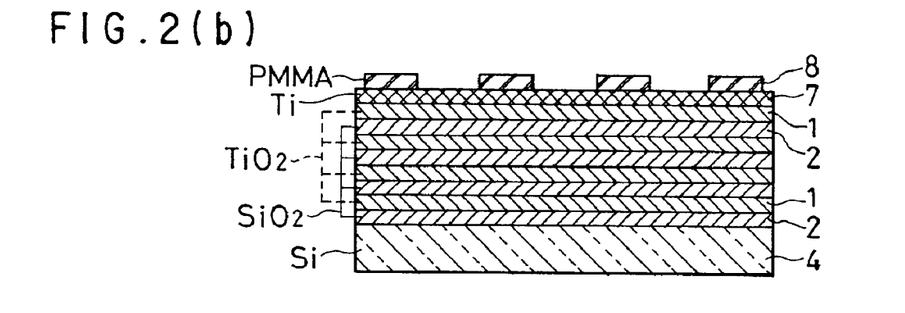
Figure 2C:
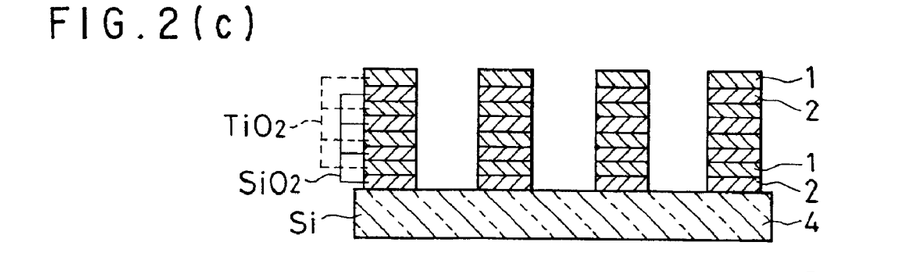

By using the same techniques repeatedly to form laminated structures of silicon dioxide as the thin-film layers of support material 2 and titanium dioxide as the thin-film layers of photocatalytic material 1, it is possible to form a multi-layer structure. Finally, once the stipulated number of laminated structures are formed, a titanium layer 7 is formed thereupon by sputtering, and then it is coated with PMMA (acrylic resin) 8 as an electron beam resist.

The number of layers of laminated structures is four in the illustrated embodiment, and if the indices of refraction of the materials are set to air (n=1) and cuticle (n=1.5), while this number affects the saturation (vividness) and luminosity (brightness) of the color to be exhibited, no large difference appears in the saturation and luminosity when the number of layers is six or greater. Accordingly, from a practical standpoint, it is sufficient to laminate roughly six layers of photocatalytic thin film.

Thereafter, as shown in FIG. 2(*b*), patterning of the uppermost layer of PMMA is performed at a period equal to the wavelength of the desired color of light, and the titanium layer 7 is dry etched with $SF_6$. The dry etching apparatus used at this time may be a parallel horizontal plate type reactive ion etching apparatus. The etching gas used at this time may be $SF_6$, $CHF_3$ or these to which $O_2$ is added, and etching can be performed at an etching gas flow of a total flow of 40 sccm, with the pressure at the time of etching fixed at 4.5 Pa and the applied RF power of 100 W. The structure shown in FIG. 2(*c*) is obtained by such dry etching.

Figure 2D:
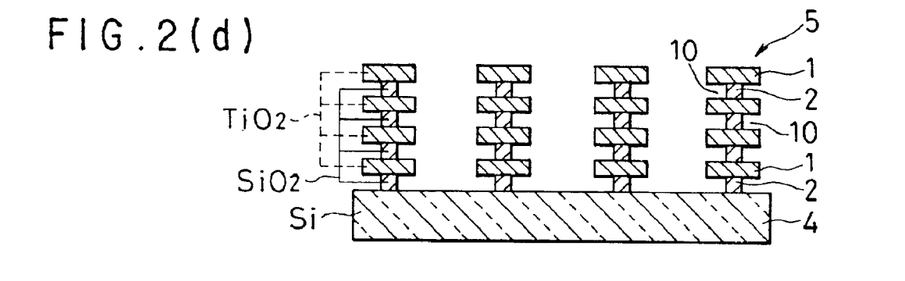

Thereafter, BHF is used to perform wet etching of the silicon dioxide film to form a vacant layer or space 10 on the back side of the thin-film layers of photocatalytic material 1. The thickness of this vacant layer 10 is the thickness of the silicon dioxide film serving as the layer of support material, so its thickness is λ/4.

Note that in addition to the aforementioned manufacturing method, as the raw material gas for performing the aforementioned dry etching, it is possible to use argon gas or oxygen gas as the gas that performs physical etching simultaneously with chlorine gas, hydrogen fluoride gas or hydrogen chloride gas as the gas that performs chemical etching, thereby forming the thin-film layers of support material with a surface area smaller than that of the thin-film layers of photocatalytic material without the step of performing wet etching, and thus forming the vacant layers that are open to the outside.

The substrate 4 is not limited to rigid material, but flexible materials may also be used. In this case, during the exposure process, the substrate may be secured to rigid, flat base material and then processed, and when the formation of the photocatalytic colored member 5 upon the substrate 4 is complete, by separating the aforementioned base material from the substrate, it can be used as wall covering material with a curved surface.

Figure 3:
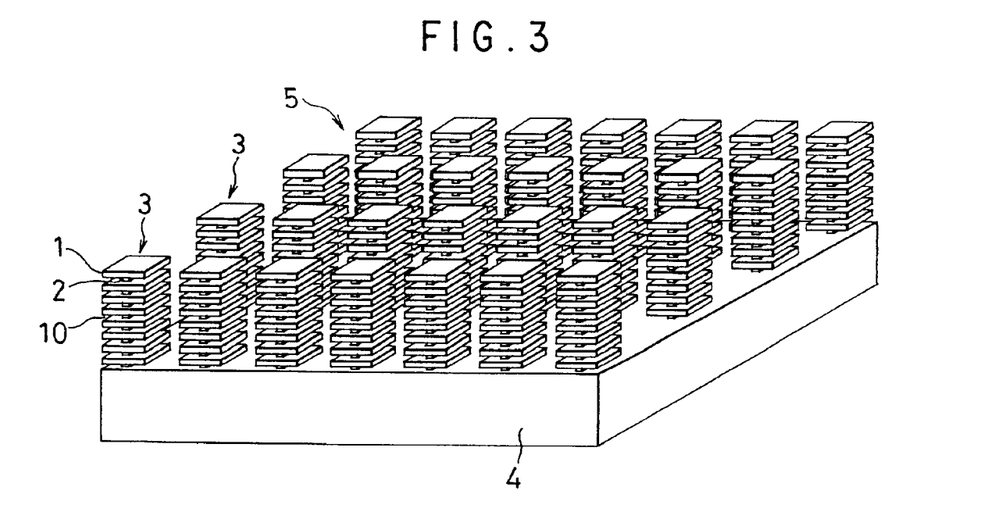
FIG. 3 is a perspective diagram showing another embodiment of the photocatalytic colored member according to the present invention.

In the embodiment of FIG. 1, an example of disposing a plurality of rows of photocatalytic colored bodies 3 at equal intervals upon a substrate 4 is shown, but it is also possible to dispose a large number of square photocatalytic colored bodies 3 at equal intervals both lengthwise and crosswise upon the substrate 4, as shown in FIG. 3. With the aforementioned constitution, no matter what direction in the X-Y plane it is viewed from, a plurality of parallel grooves, or a plurality of perpendicular grooves is formed. In this manner, by adopting a two-dimensional periodic structure, it is possible to reduce the effects of polarization of incident light.

Figure 4A:
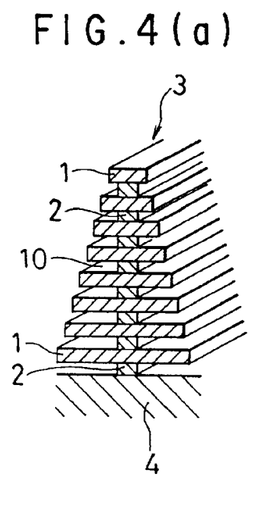
FIG. 4(a) is a perspective diagram showing the state wherein the surface area of the laminated thin-film layers of photocatalytic colored member according to the present invention becomes larger when going from the surface to lower layers.
Figure 4B:
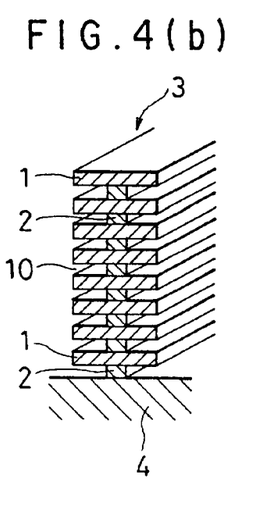
FIG. 4(b) is a perspective diagram showing the state wherein the surface area of the aforementioned laminated thin-film layers is uniform.
Figure 4C:
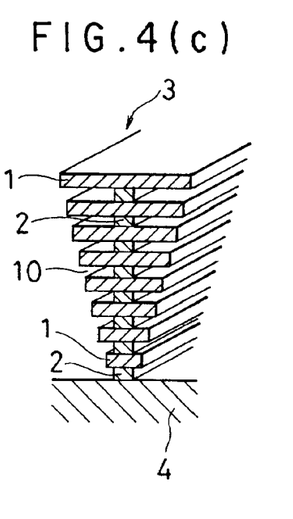
FIG. 4(c) is a perspective diagram showing the state wherein the surface area of the aforementioned laminated thin-film layers becomes smaller when going from the surface to lower layers.

In addition, in the various aforementioned embodiments, the plurality of laminated thin-film layers of photocatalytic material 1 interspersed with thin-film layers of support material 2 all have equal surface areas, but they can also be formed such that the surface area of the thin-film layers of photocatalytic material 1 becomes larger going from the surface toward the lower layers, as shown in FIG. 4(*a*). Or, they can also be formed such that the surface area becomes smaller going from the surface toward the lower layers, as shown in FIG. 4(*c*). Note that for the sake of comparison, FIG. 4(*b*) shows the photocatalytic colored body 3 of FIG. 1(*b*) above. Note that such laminates may be provided over the entire surface of the substrate, or only a single one may also be disposed.

As described above, by varying the width of the thin-film layers of support material 2, it is possible to reduce the half-width of the main lobe of the reflection spectral characteristic, so a highly saturated (vivid) color can be exhibited.

Figure 5:
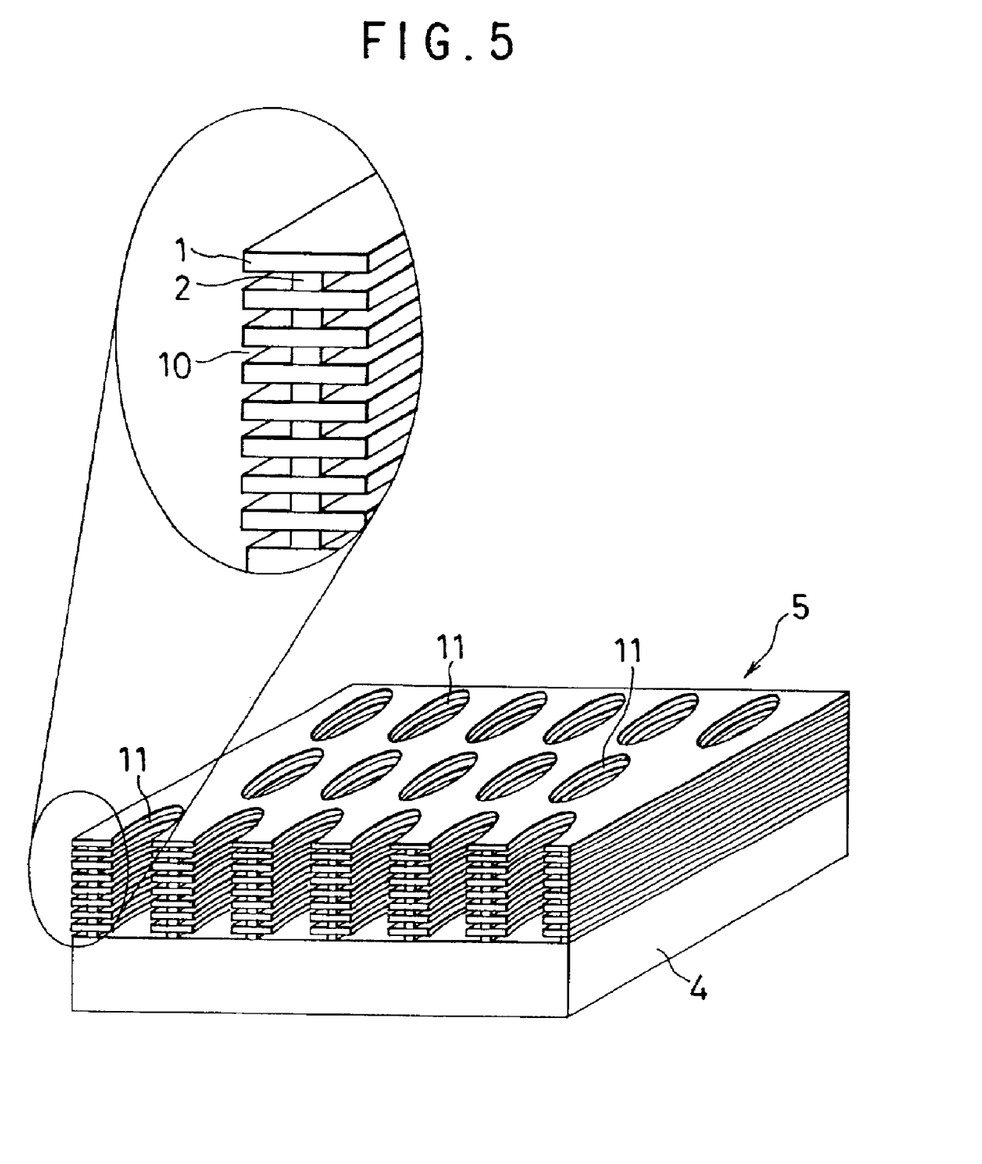
FIG. 5 is a perspective diagram showing still another embodiment of the photocatalytic colored member according to the present invention.

Moreover, in the aforementioned embodiments, all of them have been examples formed of a plurality of grooves when viewed from the surface, but it is also possible to form openings 11 which are elliptical in shape when viewed from the surface. These openings 11 are not limited to the aforementioned elliptical shapes, but other shapes, e.g. circles, polygons or the like may also be selected. In addition, the openings need not be formed uniformly as described above, as they may also be disposed nonuniformly.

As described above, when openings are provided in the laminate structure, the surface area of the photocatalytic thin-film (surface area of contact with the substance to be purified) becomes larger. In addition, when openings are provided, a two-dimensional periodic structure results, so the number of shape parameters that can control coloring increases, so fine control of the colored light becomes possible.

In addition, as the size or number of openings increases, the substance to be purified enters into the interior more easily, but if they become too large or numerous, the surface area of photocatalytic material is reduced, so appropriate selection is necessary.

The photocatalytic colored member according to the present invention assumes the aforementioned structure and is also manufactured as described above, but in order to achieve a high photocatalytic effect, the surface area of contact with the substance to be decomposed must be increased. So regarding the aforementioned conventional Problem 1 wherein the surface area of contact between the photocatalytic material and contaminant must be increased, with the present invention, as shown in FIG. 1, by adopting a structure wherein grooves are provided to separate the photocatalytic colored member into photocatalytic colored bodies 3, or by adopting a structure wherein openings 11 are provided, a shape wherein even the bottom surfaces of the thin-film layers of photocatalytic material communicate with the outside, so its surface area can be made extremely large, thus solving the aforementioned Problem 1.

To wit, according to the present invention, the photocatalytic material is not dispersed in raw materials, but rather it consists solely of photocatalytic material, and moreover the photocatalytic material is made into thin films separated by vacant layers, thus giving a multi-layer film structure for photocatalytic material having fine grooves. Moreover, by adopting such a structure, since the pure material of titanium oxide which is the photocatalytic material is colorless and transparent, exhibiting a white color in powder form, based on the light diffraction effects due to this structure, an additional effect is generated wherein coloring can be obtained due to interference colors.

On the other hand, by using $SiO_2$ or other transparent inorganic substance as the spacer that gives a constant interval between thin-film layers of photocatalytic material, it is possible to avoid the conventional Problem 2 of deterioration of the member itself due to the photocatalytic material. In addition, both the photocatalytic material and silicon dioxide are substances that are stable above 300° C., the decomposition temperature of Teflon, so they can be used stably over the long term in a wide range of applications.

Moreover, by means of the aforementioned structure of the present invention, it is possible to create a fine, multi-layer thin-film structure and groove structure which is additionally beautifully colored. This is known as structural coloring, a structure for which the present inventors were the first ever to perform a theoretical elucidation. Thereby, there is no need to color the resin sheet when photocatalytic material is adhered to a resin sheet or other carrier material, and the desired color can be maintained over the long term, so conventional Problem 3 can be solved.

In addition, there is no need to run a current through the raw material itself as in the method wherein a sub-micron thin film of titanium oxide is formed by anodizing the surface of a metallic titanium plate, thereby coloring by the effect of interference of light between the titanium plate and the surface of titanium oxide, so it is possible to use inexpensive glass plates as well as steel plates or a variety of other materials. In addition, there is no need to give the titanium metal surface a high smoothness, and titanium oxide with the anatase structure having a large photocatalytic effect can be used, so it is possible to solve the aforementioned conventional Problem 4. In addition, there is no need to give the titanium oxide a sub-micron film thickness or perform even finer film-thickness control down to $\frac{1}{10}$ of that, so the aforementioned Problem 5 can be solved.

Moreover, as described above, the photocatalytic colored member according to the present invention is not a simple diffraction grating, but rather it takes a diffraction structure based on an optical dielectric multi-layer film, so the angular dependence of coloring can be reduced and it is possible to obtain the desired color over a wide angular range, thus solving the conventional Problem 6.

In addition, the fact that this structural coloring structure has a photocatalytic effect means that minute contaminants adhering to this structure can be removed by the photocatalytic effect. Thereby, the aforementioned conventional Problem 7 can be solved.

When the photocatalytic colored member of the present invention is used as an external wall covering, a large number of photocatalytic colored members are formed upon substrates which are attached to the wall material. As long as the place to be used is flat, then it is possible to pattern a large surface area by repetition with a stepper such as that used in the semiconductor process of photolithography. In addition, a flexible substrate may be secured to rigid, flat base material and once the photocatalytic colored member is formed upon the substrate, by separating the base material from the substrate and securing it to a curved base material, it can be used as a curved member with a colored structure.

What is claimed is:

1. A photocatalytic member having photocatalytic and color forming properties; said member comprising:
   a substrate; and
   a laminate deposited on the substrate, which laminate has a plurality of thin-film photocatalytic layers, each consisting of a photocatalytic material, and a plurality of thin-film support layers;
   wherein the plurality of thin-film photocatalytic layers and the plurality of thin-film support layers alternate with each other and contact sequentially at surface areas, wherein each thin-film support layer has a smaller surface area than the surface area of the contacting thin-film photocatalytic layers, leaving a space between adjacent photocatalytic layers and next to a support layer, said space being open to the outside of said member, the thin-film photocatalytic layer nearest the substrate being the lowermost of said thin-film photocatalytic layers, the remaining layers being sequentially more distant from the substrate; and
   wherein said plurality of thin-film photocatalytic layers consist of titanium dioxide.

2. The photocatalytic member according to claim 1, further comprising an opening on a surface of said member and through a thin-film photocatalytic layer, and wherein a space communicates with the opening in order to be open to the outside of said member by way of the opening.

3. The photocatalytic member according to claim 2, wherein said openings are shaped like parallel grooves.

4. The photocatalytic member according to claim 2, wherein said opening comprises a plurality of openings disposed at uniform intervals.

5. The photocatalytic member according to claim 2, wherein said opening comprises a plurality of openings disposed at nonuniform intervals.

6. The photocatalytic member according to claim 1, wherein said plurality of thin-film support layers are made of one member selected from the group consisting of metals, semiconductors and insulators, each with a melting point of 400° C. or higher.

7. The photocatalytic member according to claim 1, wherein the plurality of thin-film photocatalytic layers have surface areas equal to each other.

8. The photocatalytic member according to claim 1, wherein said plurality of thin-film photocatalytic layers have surface areas becoming larger toward the lowermost thin-film photocatalytic layer.

9. The photocatalytic member according to claim 1, wherein said plurality of thin-film photocatalytic layers have surface areas becoming smaller toward the lowermost thin-film photocatalytic layer.

10. The photocatalytic member according to claim 1, wherein said titanium dioxide has an anatase structure.

11. The photocatalytic member according to claim 1, wherein said titanium oxide has an amorphous structure.

12. A photocatalytic member having photocatalytic and color forming properties; said member comprising:
a substrate; and
a laminate deposited on the substrate, which laminate has a plurality of thin-film photocatalytic layers, each consisting of a photocatalytic material, and a plurality of thin-film support layers;
wherein the plurality of thin-film photocatalytic layers and the plurality of thin-film support layers alternate with each other and contact sequentially at surface areas, wherein each thin-film support layer has a smaller surface area than the surface area of the contacting thin-film photocatalytic layers, leaving a space between adjacent photocatalytic layers and next to a support layer, said space being open to the outside of said member, the thin-film photocatalytic layer nearest the substrate being the lowermost of said thin-film photocatalytic layers, the remaining layers being sequentially more distant from the substrate, and
further comprising an opening on a surface of said member and through a thin-film photocatalytic layer, and wherein a space communicates with the opening in order to be open to the outside of said member by way of the opening, wherein said opening is circular, elliptical or polygonal.

13. The photocatalytic member according to claim 12, wherein said plurality of thin-film photocatalytic layers consist of titanium oxide with an anatase structure.

14. The photocatalytic member according to claim 12, wherein said plurality of thin-film photocatalytic layers consist of titanium oxide with an amorphous structure.

15. The photocatalytic member according to claim 12, wherein said plurality of thin-film support layers are made of one member selected from the group consisting of metals, semiconductors and insulators, each with a melting point of 400° C. or higher.

16. The photocatalytic member according to claim 12, wherein said openings are shaped like parallel grooves.

17. The photocatalytic member according to claim 12, wherein said opening comprises a plurality of openings disposed at uniform intervals.

18. The photocatalytic member according to claim 12, wherein said opening comprises a plurality of openings disposed at nonuniform intervals.

19. The photocatalytic member according to claim 12, wherein the surface areas of the layers of said laminated thin-film layers of photocatalytic material are equal to each other.

20. The photocatalytic member according to claim 12, wherein said plurality of thin-film photocatalytic layers have surface areas becoming larger toward the lowermost thin-film photocatalytic layers.

21. A photocatalytic member having photocatalytic and color forming properties; said member comprising:
a substrate; and
a laminate deposited on the substrate, which laminate has a plurality of thin-film photocatalytic layers, each consisting of a photocatalytic material, and a plurality of thin-film support layers;
wherein the plurality of thin-film photocatalytic layers and the plurality of thin-film support layers alternate with each other and contact sequentially at surface areas, wherein each thin-film support layer has a smaller surface area than the surface area of the contacting thin-film photocatalytic layers, leaving a space between adjacent photocatalytic layers and next to a support layer, said space being open to the outside of said member, the thin-film photocatalytic layer nearest the substrate being the lowermost of said thin-film photocatalytic layers, the remaining layers being sequentially more distant from the substrate, and
further comprising an opening on a surface of said member and through a thin-film photocatalytic layer, and wherein a space communicates with the opening in order to be open to the outside of said member by way of the opening, and
wherein said plurality of thin-film support layers are disposed at a center of said spaces to support the thin-film photocatalytic layers and maintain said spaces and each support layer has a circular, elliptical or polygonal cross section when viewed from the surface of said member, and said laminate is deposited on a portion or an entire surface of the substrate.

22. The photocatalytic member according to claim 21, wherein said plurality of thin-film photocatalytic layers consist of titanium oxide with an anatase structure.

23. The photocatalytic member according to claim 21, wherein said plurality of thin-film photocatalytic layers consist of titanium oxide with an amorphous structure.

24. The photocatalytic member according to claim 21, wherein said plurality of thin-film support layers are made of one member selected from the group consisting of metals, semiconductors and insulators, each with a melting point of 400° C. or higher.

25. The photocatalytic member according to claim 21, wherein said openings are shaped like parallel grooves.

26. The photocatalytic member according to claim 21, wherein said opening comprises a plurality of openings disposed at uniform intervals.

27. The photocatalytic member according to claim 21, wherein said opening comprises a plurality of openings disposed at nonuniform intervals.

28. The photocatalytic member according to claim 21, wherein the surface areas of the layers of said laminated thin-film layers of photocatalytic material are equal to each other.

29. A photocatalytic member having photocatalytic and color forming properties; said member comprising:
a substrate; and
a laminate deposited on the substrate, which laminate has a plurality of thin-film photocatalytic layers, each consisting of a photocatalytic material, and a plurality of thin-film support layers;
wherein the plurality of thin-film photocatalytic layers and the plurality of thin-film support layers alternate with each other and contact sequentially at surface areas, wherein each thin-film support layer has a smaller surface area than the surface area of the contacting thin-film photocatalytic layers, leaving a space between adjacent photocatalytic layers and next to a support layer, said space being open to the outside of said member, the thin-film photocatalytic layer nearest the substrate being the lowermost of said thin-film photocatalytic layers, the remaining layers being sequentially more distant from the substrate; and wherein said plurality of thin-film photocatalytic layers consist of titanium oxide with an anatase structure.

30. The photocatalytic member according to claim 29 further comprising an opening on a surface of said member and through a thin-film photocatalytic layer, and wherein a space communicates with the opening in order to be open to the outside of said member by way of the opening.

31. The photocatalytic member according to claim 29 wherein said plurality of thin-film support layers are made of one member selected from the group consisting of metals with a melting point of 400° C. or higher, semiconductors and insulators.

32. The photocatalytic member according to claim 30, wherein said openings are shaped like parallel grooves.

33. The photocatalytic member according to claim 30, wherein said opening comprises a plurality of openings disposed at uniform intervals.

34. The photocatalytic member according to claim 30, wherein said opening comprises a plurality of openings disposed at nonuniform intervals.

35. The photocatalytic member according to claim 29, wherein the plurality of thin-film photocatalytic layers have surface areas equal to each other.

36. The photocatalytic member according to claim 29, wherein said plurality of thin-film photocatalytic layers have surface areas becoming larger toward the lowermost thin-film photocatalytic layer.

37. The photocatalytic member according to claim 29, wherein said plurality of thin-film photocatalytic layers have surface areas becoming smaller toward the lowermost thin-film photocatalytic layer.

38. A photocatalytic member having photocatalytic and color forming properties; said member comprising:
   a substrate; and
   a laminate deposited on the substrate, which laminate has a plurality of thin-film photocatalytic layers, each consisting of a photocatalytic material, and a plurality of thin-film support layers;
   wherein the plurality of thin-film photocatalytic layers and the plurality of thin-film support layers alternate with each other and contact sequentially at surface areas, wherein each thin-film support layer has a smaller surface area than the surface area of the contacting thin-film photocatalytic layers, leaving a space between adjacent photocatalytic layers and next to a support layer, said space being open to the outside of said member, the thin-film photocatalytic layer nearest the substrate being the lowermost of said thin-film photocatalytic layers, the remaining layers being sequentially more distant from the substrate; and
   wherein said plurality of thin-film photocatalytic layers consist of titanium oxide with an amorphous structure.

39. The photocatalytic member according to claim 38 further comprising an opening on a surface of said member and through a thin-film photocatalytic layer, and wherein a space communicates with the opening in order to be open to the outside of said member by way of the opening.

40. The photocatalytic member according to claim 39, wherein said openings are shaped like parallel grooves.

41. The photocatalytic member according to claim 39, wherein said opening comprises a plurality of openings disposed at uniform intervals.

42. The photocatalytic member according to claim 39, wherein said opening comprises a plurality of openings disposed at nonuniform intervals.

43. The photocatalytic member according to claim 38, wherein said plurality of thin-film support layers are made of one member selected from the group consisting of metals with a melting point of 400° C. or higher, semiconductors and insulators.

44. The photocatalytic member according to claim 38, wherein the plurality of thin-film photocatalytic layers have surface areas equal to each other.

45. The photocatalytic member according to claim 38, wherein said plurality of thin-film photocatalytic layers have surface areas becoming larger toward the lowermost thin-film photocatalytic layer.

46. The photocatalytic member according to claim 38, wherein said plurality of thin-film photocatalytic layers have surface areas becoming smaller toward the lowermost thin-film photocatalytic layer.

* * * * *

UNITED STATES PATENT AND TRADEMARK OFFICE
CERTIFICATE OF CORRECTION

PATENT NO.     : 6,913,811 B2
DATED          : July 5, 2005
INVENTOR(S)    : Itoh et al.

It is certified that error appears in the above-identified patent and that said Letters Patent is hereby corrected as shown below:

Title page,
Item [73], Assignee, should read:
-- [73] Assignees: Agency of Industrial Science & Technology, Ministry of International Trade & Industry, Tokyo (JP)

Hideo Itoh, Tsukuba (JP) --.

Signed and Sealed this

Sixth Day of September, 2005

JON W. DUDAS
*Director of the United States Patent and Trademark Office*